Aug. 9, 1955 J. R. GUARINO 2,715,097
APPARATUS FOR DIALYZING FLUIDS
Filed March 20, 1953 3 Sheets-Sheet 1
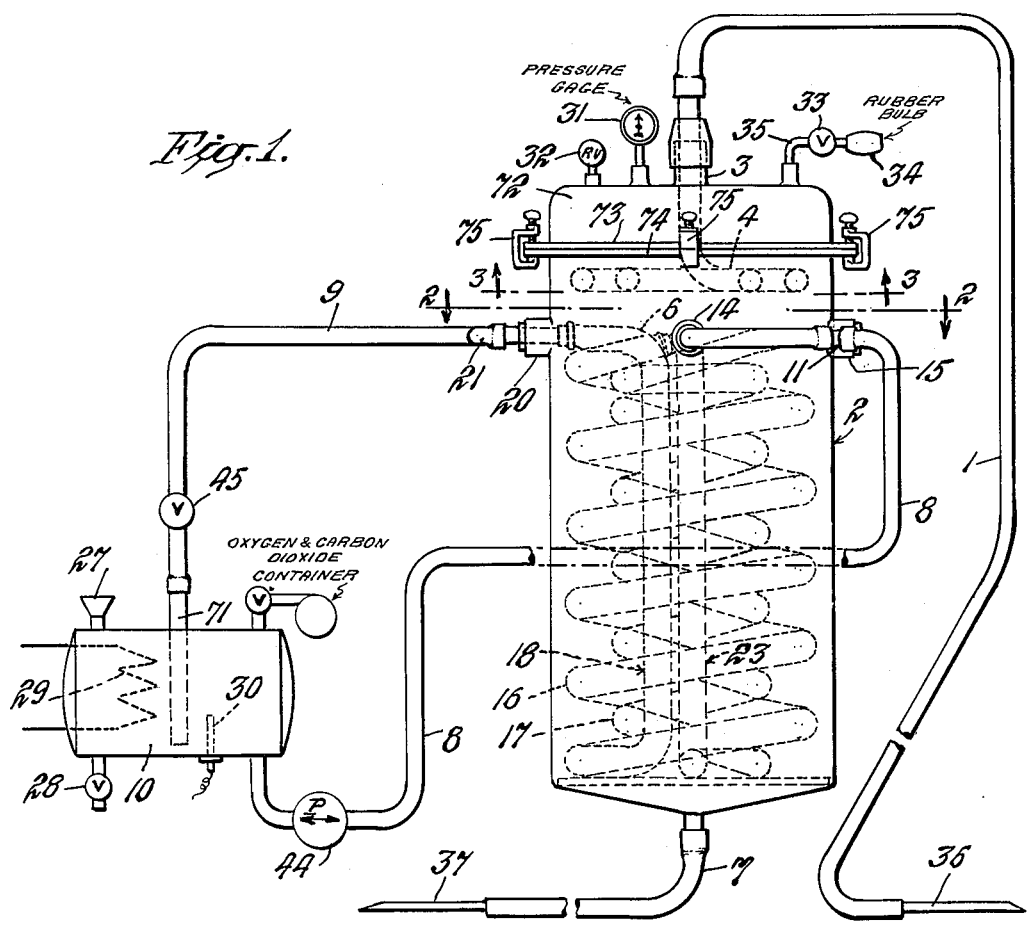
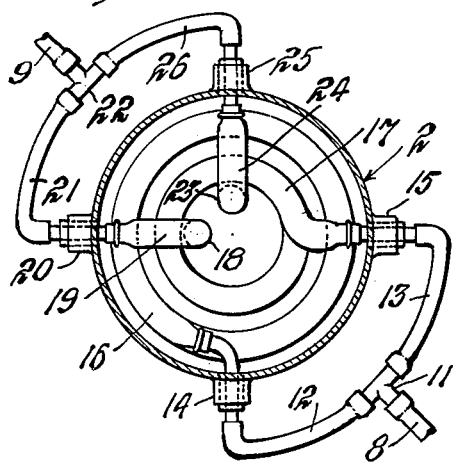
INVENTOR.
JOHN RALPH GUARINO
BY Gusto Drews
his ATTORNEY

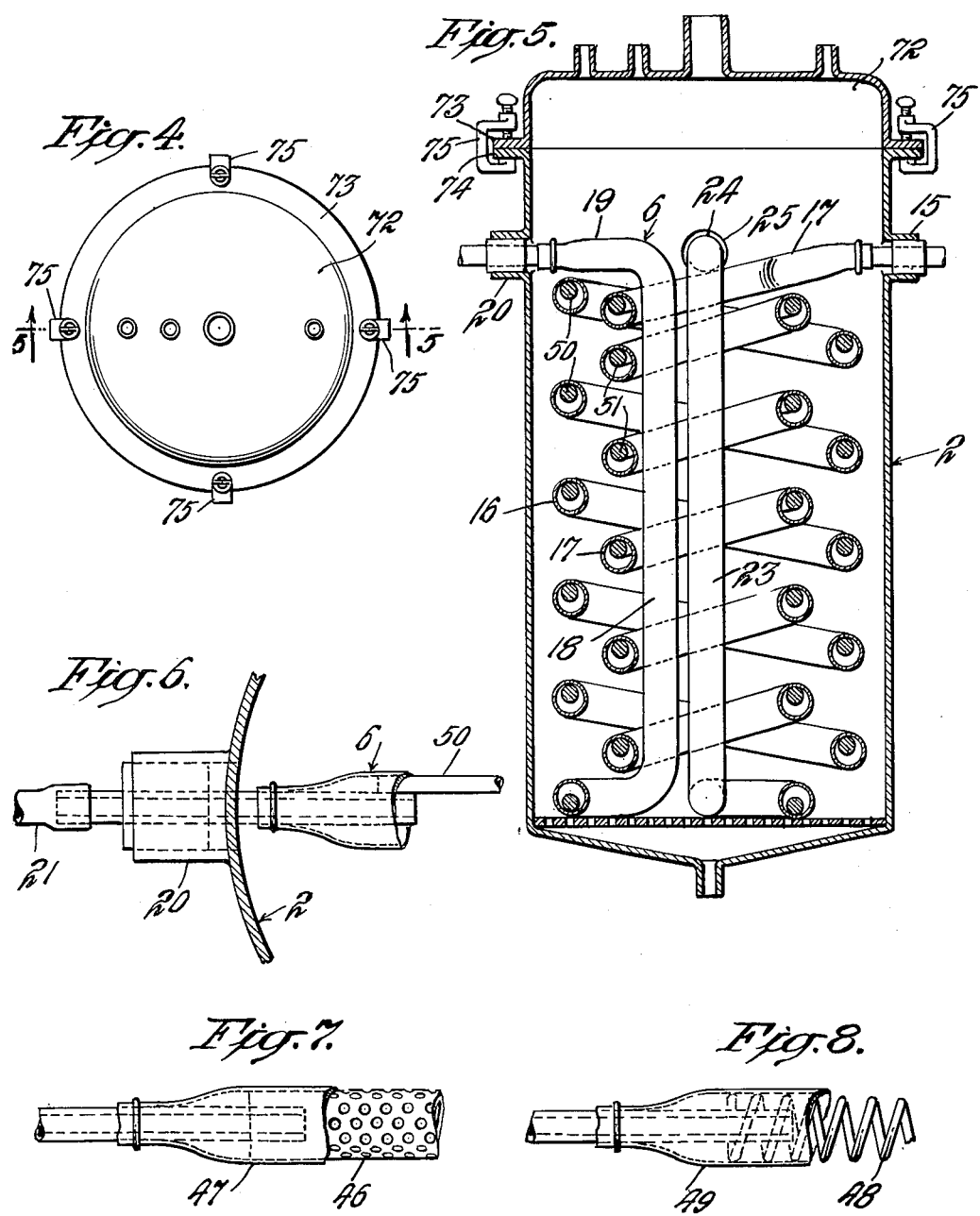

Aug. 9, 1955     J. R. GUARINO     2,715,097
APPARATUS FOR DIALYZING FLUIDS
Filed March 20, 1953     3 Sheets-Sheet 3
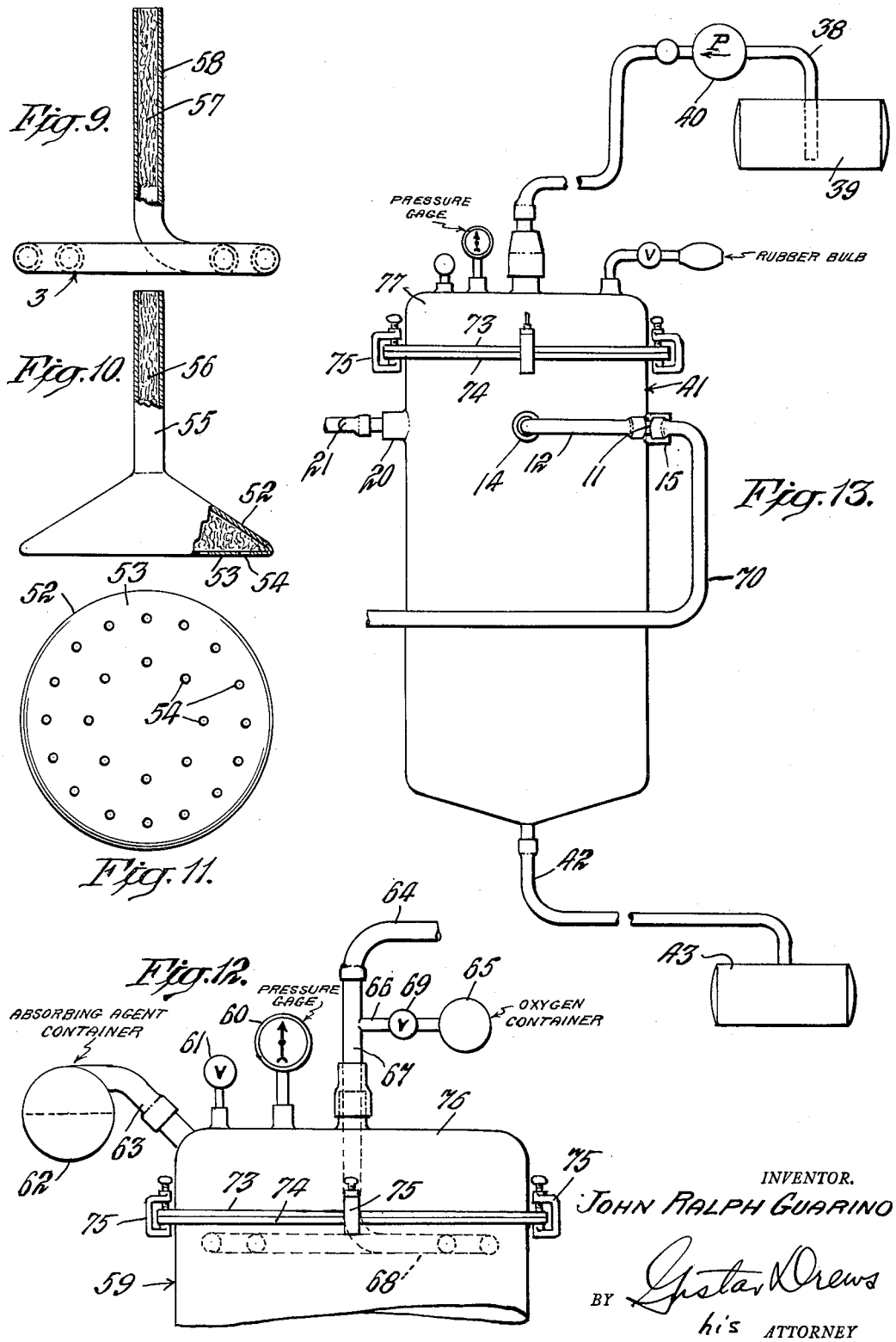
INVENTOR.
JOHN RALPH GUARINO
BY Gustav Drews
his ATTORNEY

United States Patent Office 2,715,097
Patented Aug. 9, 1955

2,715,097

APPARATUS FOR DIALYZING FLUIDS

John Ralph Guarino, Kew Gardens, N. Y., assignor, by direct and mesne assignments, to Dialyzer Company of America, Inc., New York, N. Y., a corporation of New York Application March 20, 1953, Serial No. 343,671

8 Claims. (Cl. 210—8.5)

This invention relates in general to apparatus for dialyzing fluids, not only the human blood but any mixture of colloids, proteins and non-dialyzable substances, such as disclosed in my prior issued Patent No. 2,474,665 dated June 28, 1949. This application constitutes a continuation in part of my copending application Ser. No. 280,730 filed April 5, 1952.

Among the objects of the present invention it is aimed to provide a container into which the liquid or fluid to be dialyzed is introduced and dispersed while being introduced and means contained in the container which will obstruct the passage of the fluid to be dialyzed so that the fluid will be intercepted and the impurities removed while being so intercepted before the fluid is discharged from the container.

More specifically the present invention aims to provide an interceptor in the form of a conduit through which the wash fluid or dialyzing medium passes, which interceptor is composed of a substance which will selectively permit the passage of objectionable impurities, but bar the passage of the desirable constituents of the fluid to be purified, to enable the impurities to pass into the interceptor and carried off by the wash fluid, which interceptor is located in a container and in the path of movement of the fluid to be purified.

It is still another object of the present invention to provide an apparatus in which an interceptor through which the wash fluid passes is located, and which interceptor is composed of a substance such as cellophane or the like semi-permeable substance, which will permit the impurities to pass through the same and be carried away by the wash fluid, and which container is provided with a disperser at the inlet discharge end of the conduit conveying the fluid to be purified to the container, which disperser in turn disperses and directs the fluid so received on to the interceptor, and a discharge outlet for removing the fluid after it has been purified.

These and other features, capabilities and advantages of the present invention will appear from the subjoined detailed description of one specific embodiment thereof illustrated in the accompanying drawings, in which Fig. 1 is a side elevation of one embodiment of the present invention.

Fig. 2 is a section on the line 2—2 of Fig. 1.

Fig. 3 is a section on the line 3—3 of Fig. 1.

Fig. 4 is a plan view with the connecting attachments removed from the top of the main container.

Fig. 5 is a transverse section on the line 5—5 of Fig. 4.

Fig. 6 is an enlarged fragmental section on the line 6—6 of Fig. 5.

Fig. 7 is a modification of the detail illustrated in Fig. 6.

Fig. 8 is a second modification of the detail illustrated in Fig. 6.

Fig. 9 is an enlarged side elevation of the disperser illustrated in Fig. 1.

Fig. 10 is a transverse section of a modification of the disperser illustrated in Fig. 9.

Fig. 11 is a bottom plan view of the disperser illustrated in Fig. 10.

Fig. 12 is a fragmental side elevation of a second container showing another arrangement of connections to the same.

Fig. 13 is a side elevation of the container illustrated in Fig. 1 connected for commercial use as distinguished from medical use.

In the embodiment shown in Figs. 1 to 6, inclusive, there is illustrated a first conduit 1 connected either to a supply of the fluid to be treated or to the patient whose blood is to be treated, which conduit is connected to the container 2 in the present instance to the upper end of a dispersion unit 3 which extends down into the container and terminates in a spiral tubular formation 4 having perforations 5 in the lower surface of the spiral formation 4 to permit the fluid or blood to be treated to be discharged from such perforations 5 in a cascade in order to facilitate its effective contact with the interceptor 6. At the lower end of the container 2 there is provided a second conduit 7 to tap off or permit removal of the fluid or blood after it has been dialyzed or treated. A third conduit consisting of the inlet portion 8 and of the outlet portion 9 is connected to the reservoir or container 10. The container 10 when used for treating the blood of a patient may contain a wash fluid or mixture consisting of sodium chloride, potassium chloride, sodium bicarbonate, magnesium chloride and glucose. The inlet portion 8 of this third conduit extends from the container 10 to the T 11 which in the present instance has two branch conduits 12 and 13 connected to the inlet discharge units 14 and 15, respectively, which in turn are connected to the fourth conduit or interceptor 6 which has two branches, an outer spiral branch 16, and an inner spiral branch 17, the outer branch 16 being connected at its lower end, see Fig. 1, to the vertical portion 18 which is connected to the horizontal portion 19 at its upper end, which in turn is connected to the outlet discharge unit 20 connected to a conduit branch 21 connected to the T 22, and in turn connected to the outlet conduit portion 9. In turn the inner spiral branch 17 is connected to the vertically extending conduit portion 23 which at its upper end is connected to the horizontally extending portion 24 which is connected to the outlet discharge unit 25 at the end of the conduit branch 26 connected to the T 22 which is also connected to the outlet conduit portion 9.

The conduit portions 8 and 9 and their branchways 12, 13, and 21, 26, respectively, may be composed of any suitable material such as metal, rubber or the like. The container 10 is preferably provided with an inlet funnel 27 and a drain valve 28. In turn, and especially when the wash fluid is used for treating blood, the container may be provided with a suitable heating unit, such as the heater 29. Furthermore, to facilitate controlling the temperature of the wash fluid in the container, the container 10 may be provided with a suitable thermo-regulator 30 as illustrated in Fig. 1.

To facilitate regulating the pressure of the fluid being treated, particularly if the fluid being treated is blood, a pressure gauge 31 is provided. The pressure in the container 2 may also be relied upon to regulate the level of the fluid being treated, as an instance blood, in the container 2, in which case the relief valve 32 is provided to decrease the pressure and thereby raise the level of the fluid, and the check valve 33 and bellows, such as the rubber ball 34 connected to the conduit 35 connected to the container 2 provided to increase the pressure and in turn to lower the level of the fluid.

If the apparatus disclosed in Figs. 1 to 6, inclusive, is used for the treatment of blood in a patient, then the first conduit 1 is preferably provided with a cannula or chambered needle 36 to enter a predetermined blood channel or artery of the patient, and the second conduit 7 provided with a similar chambered needle or cannula 37 to enter a predetermined blood channel, such as a vein of the patient, predetermined so that the artery or blood channel tapped with the needle 36 will permit the blood to pass into the first conduit 1 and the blood channel or vein tapped by the second needle 37 will permit the blood to return to the patient from the second conduit 7.

If the fluid to be treated instead of that of blood in a patient is that of blood which had previously been removed from a patient, it will, as illustrated in the embodiment of Fig. 13, be pumped into the conduit 38 from the reservoir 39 by the pump 40 or be fed by gravity through the first conduit 38 into the container 41, and in turn be removed from the container 41 after having been treated or dialyzed by the conduit 42 connecting the conduit 41 to the rservoir or receiver 43.

If, as an instance with the embodiment illustrated in Fig. 13, the fluid received in the container 43 is to be redialyzed or retreated, the container or receiver 43 is then attached to the conduit 38 and the container 39 or another container attached to the discharge or outlet conduit 42, and the supply in the container 43 then caused to pass through the first conduit 38 into the container 41. It is of course understood that the interior of the container 41 will be similar in construction and equipment to that of the container 2 which will now be described.

The interceptor 6 consisting of the conduits 16, 17, 18, 19, 23, 24 and 25 will be arranged in the container 2 effectively to fill the cross section transversely of the container 2, in turn effectively to intercept all of the fluid or blood which passes from the perforations 5 of the disperser 3. This interceptor 6, particularly if used for the dialysis or treatment of blood, is preferably composed of a semiporous substance, such as regenerated cellulose or cellophane. In some instances the composition of the interceptor 6 may be composed of some other semiporous substance, such for instance as rubber or other vegetable parchment, animal membrane, collodion and celluidin. As an instance, if the interceptor 6 is composed of rubber and the ingredient to be removed from the fluid being dialyzed is fat soluble material, such as vitamin K, the membrane or wall composition of the interceptor 6 may be rubber or synthetic rubber and the wash medium would consist of a fat solvent such as ether, acetone, or butyl alcohol. The preference for regenerated cellulose or cellophane is due to the fact that it will permit certain ingredients of the blood to pass out of the same, such as non-protein nitrogen material including urea, uric acid, creatinine and other toxic metabolites, and the bar the passage from the blood through the same of other ingredients such as the blood cells and proteins. In turn, if the fluid to be treated is blood and the wash medium contained in the interceptor 6 consists of a fluid including sodium chloride, potassium chloride, sodium bicarbonate, magnesium chloride and glucose in amounts to make it isotonic to the blood, these substances will not be removed from the blood. In turn, if the wash should also include calcium chloride in predetermined amounts it will likewise bar the removal of calcium ions from the blood of the patient.

If it should be desired to increase the rate of diffusion of the ingredients to be removed from the blood being treated and passed over to the wash medium, it may be desirable to reduce the pressure in the interceptor 6 to a pressure below the pressure in the container 2, in which case the reversible variable delivery pump 44 instead of pumping the wash fluid from the container 10 through the conduit portion 8 into the interceptor 6, may now be reversed to withdraw the wash medium out of the interceptor 6. To aid the pump 44 in effectively reducing the pressure in the interceptor 6 as compared to the pressure in the container 2, the throttle valve 45 connected to the conduit portion 9 may be actuated to reduce the rate of flow through the conduit portion 9 into the interceptor 6 restricting the flow so that the flow will be materially reduced, and the pressure thereby in turn reduced in the interceptor 6 as compared to the pressure in the container 2.

If the wall of the interceptor 6 is composed of a porous material such as cellulose acetate which would be sensitive to a difference in pressure between the exterior and interior of the same, then if the pressure in the container 2 were predetermined to be greater than the pressure within the interceptor 6, the rate of diffusion between the ingredients of the fluid being treated and the wash medium would be materially accelerated. When the pressure is so determined, due to the flexibility or yieldability of the interceptor 6, unless it were reenforced it would collapse. For this reason either a perforated tube 46 as illustrated in Fig. 7, preformed to conform to the spiral shape illustrated in Figs. 1 and 5, is introduced into the interceptor 47 to take the place of the interceptor 6 disclosed in Figs. 1 and 5, or else a helical wire 48 substituted for the perforated tube 46 inserted in the interceptor 49. Obviously, any other reenforcing structure which will permit the passage of the wash medium through the interceptor 6, 47 or 49 without causing the same to collapse could be used without departing from the spirit of the invention. In the embodiment illustrated in Figs. 1 to 6, inclusive, a comparatively narrow wire 50 is introduced into the coil 16 of the interceptor 6 being preformed to position the outer coil 16, and a second wire 51 introduced into the inner coil 17 similarly preformed to position the inner coil 17 of the interceptor 6 within the outer coil 16 as illustrated in Figs. 1 and 5. The wires 48, 50, 51 and the perforated tube 46 constituting skeletonized reenforcements may be rubber coated if desired without departing from the general spirit of the invention. The wires 50 and 51 of small diameter used in the embodiment of Figs. 1 to 6 will of course serve to maintain the two conduit branches 16 and 17 in their spiral form, but due to the fact as illustrated that they are narrower in diameter than the diameter of the inner chambers of the conduit branches 16 and 17, these wires 50 and 51 will not maintain the conduit branches 16 and 17 against collapse as effectively as the perforated tube 46 of the embodiment illustrated in Fig. 7 or the helical wire 48 of the embodiment illustrated in Fig. 8.

In place of the disperser 3 illustrated in Figs. 1, 3, and 9, the funnel shaped nozzle 52 may be provided, see Figs. 10 and 11, with a lower perforated disk 53 having the perforations 54 constituting the discharge mouth thereof. Within the funnel shaped nozzle 52 and the conduit portion 55 connected thereto, there may be provided a suitable dispersing medium such as stainless steel fibre, pellets composed of stainless steel, silicone coated glass beads, or porous material such as stainless steel mesh or glass fibre. In Fig. 10 the filler 56 in the conduit neck 55, and in the funnel shaped nozzle 52, is illustrative of stainless steel fibres. The filler 57 similar to the filler 56 could be inserted in the neck 58 of the dispersing unit 3.

In the embodiment illustrated in Fig. 12, the container 59 in addition to the pressure gauge 60 and relief valve 61 similar to the pressure gauge 31 and relief valve 32 of the embodiment illustrated in Fig. 1, there is provided a vessel 62 connected by the conduit 63 to the upper end of the container 59 containing a gas absorbing agent to absorb as an instance the carbon dioxide that may be released from the blood as it enters through the first conduit 64. Excellent results have been achieved when this gas absorbing agent is composed of lime water for absorbing carbon dioxide as an instance, or charcoal as an adsorbent for adsorbing other gases such as carbon monoxide, in which case the lime water or solid carbon is disposed in the chamber or vessel 62 and the conduit 63 affords communication between the chamber 62 and the container 59 to enable such obnoxious gases to pass from the container 59 through the conduit 63 into the vessel 62.

This embodiment is also provided with an oxygen container or a vessel 65 to contain free oxygen which is connected to the stem 67 of the disperser 68. The conduit 66 preferably as shown has a throttle valve 69 formed therein to control the supply of oxygen from the container or vessel 65 to the container 59.

The embodiment disclosed in Fig. 13 as aforesaid is substantially identical to the embodiment illustrated in Fig. 1 with the exception that the fluid to be treated is here supplied to the container 41 from the container 39 and may or may not be blood, and the receptacle or receiver for the treated fluid in this instance is a container 43.

Although the conduits 1 and 7 of the embodiment illustrated in Fig. 1 are illustrated as composed of rubber, obviously other tubes may be substituted without departing from the general spirit of the invention. When flexibility is essential, then of course this tube must be composed of some flexible material such as rubber, a plastic material or the like. In turn, the conduit portion 8 may be composed of rubber and connected to the extension 70 at one end which may be composed of glass, metal or the like, and connected at its other end to the T 11 which similarly may be composed of glass, metal or the like, which T 11 is connected by the flexible conduits 12 and 13 composed of rubber or the like, to the discharge units 14 and 15. In turn the conduit 9 similarly may be composed of rubber or metal and connected to the conduit extension 71 of the container 10 at one end and at its other end connected to the T 22 which in turn is connected by the conduit extensions 21 and 26 composed of rubber or the like to the outlet discharge units 20 and 25.

Preferably when the embodiment disclosed in Fig. 1 is used in a clinic, the container 2 is composed of a heat resisting glass or a transparent plastic material. When used industrially, it may be composed of any opaque substance, such as metal or the like.

When the container 2 of the embodiment illustrated in Fig. 1 is required to be a closed chamber, then it is provided with a cap or head 72 provided with a flange 73 to rest upon a flange 74 at the upper end of the main part of the container 2, which flanges 73 and 74 may be secured to one another by suitable clamps 75. In the embodiment illustrated in Fig. 12 the main part of the container 59 may be provided with a similar cap or head 76 and the embodiment illustrated in Fig. 13 with a head 77.

In the case of ultra filtration, that is, when it is desired to vary the pressure or decrease the pressure inside of the interceptor as an instance as compared to the pressure in the container 41 of the embodiment illustrated in Fig. 13, it is conceivable that the container 41 might be opened to the atmosphere and the disperser merely suspended in the container 41 above the interceptor.

When the embodiment such as the embodiment illustrated in Fig. 1 is used clinically, blood of a patient may with facility be passed through this apparatus to remove toxic metabolites in the case of uraemia, or remove other diffusible materials such as the barbiturates in cases of barbiturate poisoning, or the removal of salicylates in cases of salicylate poisoning. In turn, when the embodiment illustrated in Fig. 13 as an instance is used industrially, it is obvious that it can be used to advantage to remove acids, bases and salts or other diffusible ingredients from non-diffusible fluid mixtures such as colloids, plant mixtures and the like.

It is obvious that various changes and modifications may be made to the details of construction without departing from the general spirit of the invention as set forth in the appended claims.

I claim:

1. In an apparatus for dialyzing fluids, the combination of a container, a vessel for a supply of a dialyzing medium, a first conduit connected to the container for receiving and introducing into the container the fluid to be dialyzed, a disperser at the inlet discharge end of said first conduit, a second conduit connected to the lower end of the container for removing the fluid after it has been dialyzed, a third conduit connected to said vessel and having inlet and outlet discharge ends extending into and disposed in said container, and a fourth conduit composed of a semipermeable membrane disposed in the container and connecting the outlet and inlet discharge ends of said third conduit and disposed in the path of the fluid being dialyzed, said disperser directing the fluid to be dialyzed freely through said container into contact with the outer surface of said fourth conduit.

2. The combination as set forth in claim 1 characterized by a pump connected to the third conduit and a control valve connected to the third conduit to cooperate with one another to effect the movement of the dialyzing medium through the fourth conduit and vary the pressure therein compared to the pressure in said container.

3. The combination as set forth in claim 1 in which the fourth conduit is composed of a semipermeable membrane and a preformed reenforcement extends through said fourth conduit to maintain the fourth conduit in a predetermined form in said container effectively to intercept the fluid to be dialyzed.

4. The combination as set forth in claim 1 in which said disperser is funnel-shaped and has obstructions therein consisting of porous material to aid in effecting the dispersion and distribution of the fluid being dialyzed.

5. The combination as set forth in claim 1 in which the fourth conduit is composed of a relatively yieldable material and a reenforcement is positioned in the same, which reenforcement is preformed into a required form to maintain the fourth conduit in the path of movement of the fluid to be dialyzed.

6. The combination as set forth in claim 1 in which the fourth conduit is composed of a relatively yieldable material and a skeletonized reenforcement disposed in said fourth conduit to prevent the collapse of the same when the pressure in the same is less than the pressure on the outside of the same, such skeletonized reenforcement being preformed to anchor the fourth conduit in the path of movement of the fluid being dialyzed.

7. The combination as set forth in claim 1 in which the fourth conduit is composed of a relatively yieldable material and a skeletonized reenforcement disposed in said fourth conduit to prevent the collapse of the same when the pressure in the same is less than the pressure on the outside of the same, the skeletonized reenforcement being spiral in conformation effectively to cause the fourth conduit to intercept the fluid being discharged by said disperser.

8. The combination as set forth in claim 1 in which the fourth conduit composed of semiporous and relatively yieldable material is spiral in form to extend substantially throughout the entire interior of the container, and a skeletonized reenforcement is disposed in said fourth conduit to prevent the collapse of the same when the pressure in the same is less than the pressure on the outside of the same, and in turn also to maintain the fourth conduit in a predetermined spiral form.

References Cited in the file of this patent

UNITED STATES PATENTS

| Number | Name | Date |
|---|---|---|
| 2,049,828 | Stevens | Aug. 4, 1936 |
| 2,197,805 | Lovett | Apr. 23, 1940 |
| 2,225,024 | Weber | Dec. 17, 1940 |
| 2,408,625 | Graham, Jr. et al. | Oct. 1, 1946 |

OTHER REFERENCES

"Surgery," vol. 26, #2, August 1949 by Ripstein et al. pages 229–231 cited.